Patented Jan. 7, 1930

1,742,322

UNITED STATES PATENT OFFICE

KARL SCHIRMACHER, OF HOCHST-ON-THE-MAIN, AND HANS SCHLICHENMAIER AND WALTER KROSS, OF BAD-SODEN, GERMANY, ASSIGNORS TO GENERAL ANILINE WORKS, INC., OF NEW YORK, N. Y., A CORPORATION OF DELAWARE

TETRAHYDRONAPHTHOSTYRILS AND PROCESS OF PREPARING THE SAME

No Drawing. Application filed November 21, 1927, Serial No. 234,898, and in Germany November 25, 1926.

The present invention relates to hydrogenated naphthostyrils and a process of preparing the same.

The invention is based on the discovery that naphthostyril, when reduced in the presence of a catalyst under pressure, can be transformed into tetrahydronaphthostyrils. By this process compounds of the following constitution:

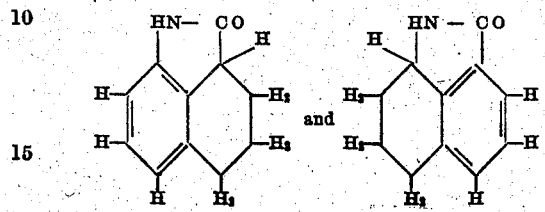

are obtainable.

The hydrogenation is advantageously effected in the presence of an indifferent solvent, such as for instance decahydronaphthalene of chlorobenzene. On a technical scale, there may be used as catalyst a metal of the iron group, in particular nickel.

The tetrahydronaphthostyrils obtainable according to our invention are important intermediate products for the manufacture of dyestuffs and compounds of pharmaceutical application.

The following example illustrates the invention, but is not intended to limit it thereto:

A mixture of 16,9 parts by weight of 1.8-naphthostyril, 150 parts of decahydronaphthalene and 0,5 parts of a nickel-catalyst as prepared, for instance, according to U. S. application Ser. No. 123,591, is placed in a bomb provided with a stirrer, which is then charged with hydrogen at 20 atmospheres pressure and the mass is heated. At 100° C. the pressure begins to fall. If the temperature is raised gradually to 130° C., hydrogen is quickly absorbed by the mass. When the pressure no longer falls, the whole is allowed to cool and the product, which largely consists of crystals mixed with the catalyst, is filtered by suction from the decahydronaphthalene and recrystallized from petrol-ether of the boiling point 120° C.–160° C. Thus there are initially obtained colorless, coarse crystals which, after being again recrystallized from xylene, melt at 157° C. They are readily soluble in alcohol or glacial acetic acid, sparingly soluble in hydrocarbons, such as benzene or xylene, very sparingly soluble in water. The compound is insoluble in sodium carbonate solution or cold caustic soda solution; in hot caustic soda solution it dissolves, after forming a yellow intermediate compound, as sodium salt of the amino-carboxylic acid of the following formula:

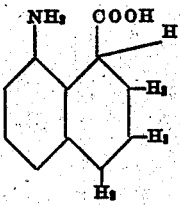

This acid can then easily be diazotized. The corresponding tetrahydro-naphthostyril has, therefore, the following constitution:

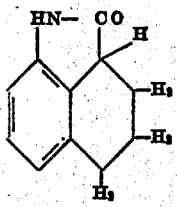

When the mother-lyes of the first and second crystallization are allowed to stand for a prolonged time, a second compound crystallizes out which on repeated recrystallization from alcohol melts at 164° C. This compound forms small colorless needles collected into druses and can be split up somewhat more difficultly than the initial compound by boiling with a caustic soda solution. Unlike the initial compound the secondary crystallization product when treated with boiling caustic soda yields without there being any formation of a yellow intermediate body an aminocarboxylic acid of the following formula:

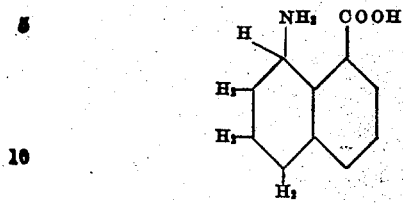

Which cannot be transformed into an aromatic diazo compound. The secondary tetrahydronaphthostyril, therefore, has the following constitution:

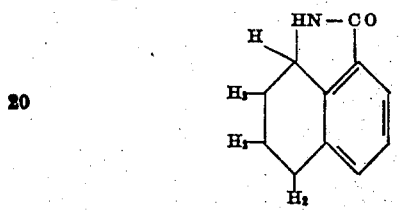

Instead of nickel, there may be used as catalyst another metal, for instance platinum or palladium. As solvent may also serve chlorobenzene instead of decahydronaphthalene. The temperature may vary between 80° C. and 180° C. and correspondingly the pressure between 10 and 50 atmospheres especially between 20 and 30 atmospheres. As regards the temperature, it is a general rule that it may be the lower the more efficient the catalyst is.

We claim:

1. The process of preparing tetrahydronaphthostyrils which comprises treating naphthostyril with hydrogen under pressure in the presence of an indifferent solvent and a hydrogenating metal catalyst of the iron group.

2. The process of preparing tetrahydronaphthostyrils which comprises treating naphthostyril with hydrogen under pressure in the presence of an indifferent solvent and a nickel catalyst.

3. The process of preparing tetrahydronaphthostyrils which comprises treating naphthostyril with hydrogen under a pressure of between 10 and 50 atmospheres in the presence of decahydronaphthalene and a hydrogenating metal catalyst of the iron group.

4. The process of preparing tetrahydronaphthostyrils which comprises treating naphthostyril with hydrogen under a pressure of between 10 and 50 atmospheres in the presence of decahydronaphthalene and a nickel catalyst.

5. The process of preparing tetrahydronaphthostyrils which comprises treating naphthostyril with hydrogen under pressure of between 20 and 30 atmospheres in the presence of decahydronaphthalene and a hydrogenating metal catalyst of the iron group.

6. The process of preparing tetrahydronaphthostyrils which comprises treating naphthostyril with hydrogen under pressure of between 20 and 30 atmospheres in the presence of decahydronaphthalene and a nickel catalyst.

7. As new products, tetrahydronaphthostyrils of the following formula:

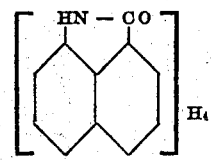

wherein one of the six-membered rings is an aromatic ring, said products being split up in the five-membered ring by means of hot caustic soda solution with formation of colorless amino-carboxylic acid salts.

8. As a new product, the naphthostyril of the following formula:

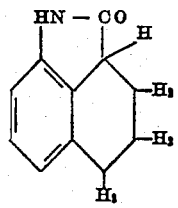

forming, when recrystallized from xylene, colorless crystals melting at 157° C. and dissolving readily in alcohol and glacial acetic acid, very difficultly in water, yielding when treated with hot caustic soda solution a salt of a diazotizable amino-carboxylic acid.

In testimony whereof, we affix our signatures.

KARL SCHIRMACHER.
HANS SCHLICHENMAIER.
WALTER KROSS.